United States Patent
Haas

(10) Patent No.: US 6,766,438 B1
(45) Date of Patent: Jul. 20, 2004

(54) RISC PROCESSOR WITH A DEBUG INTERFACE UNIT

(75) Inventor: Peter Haas, Markt Schwaben (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/674,352

(22) PCT Filed: Apr. 28, 1999

(86) PCT No.: PCT/DE99/01252

§ 371 (c)(1),
(2), (4) Date: Oct. 30, 2000

(87) PCT Pub. No.: WO99/57638

PCT Pub. Date: Nov. 11, 1999

(30) Foreign Application Priority Data

Apr. 30, 1998 (DE) .......................................... 198 19 531

(51) Int. Cl.[7] .......................... G06F 15/78; G06F 9/30; G06F 13/40
(52) U.S. Cl. ........................ 712/41; 712/215; 712/212; 712/213; 712/225; 710/305
(58) Field of Search .......................... 712/227, 41, 42, 712/215, 212, 213, 225, 24; 714/805; 711/143, 125; 710/305

(56) References Cited

U.S. PATENT DOCUMENTS 5,233,694 A * 8/1993 Hotta et al. .................. 712/215
5,513,363 A * 4/1996 Kumar et al. .................. 712/24
5,526,482 A * 6/1996 Stallmo et al. ............. 714/805
5,564,028 A    10/1996 Swoboda et al. ........... 712/227

FOREIGN PATENT DOCUMENTS

EP           0 764 903 A1      3/1997

OTHER PUBLICATIONS

Circello et al., "A Mechanism to Output Internal State Information During Idle Bus Cycles", Motorola Technical Developments, Jun. 1994, vol. 22, pp. 24–26.

* cited by examiner

Primary Examiner—Daniel H. Pan
(74) Attorney, Agent, or Firm—Morrison & Foerster LLP

(57) ABSTRACT

The present invention provides a RISC processor with a debug interface unit that enables the external replication of the data processing sequence within a RISC processor for debug purposes. The data exchanged between the sequence controller and the instruction decoder are intermediately stored and forwarded via a free bus line to an interface unit. In the interface unit, the data pending at its inputs are forwarded to defined outputs of the interface. This allows the register contents to be co-read in real time. Accordingly, all the required information to perform an efficient error search are displayed for an outside operator who may then monitor the data processing sequence and conduct an error search.

4 Claims, 2 Drawing Sheets

CMD 0 = Execute / Jump
CMD 1 = Load
CMD 2 = Store

RISC PROCESSOR WITH A DEBUG INTERFACE UNIT

BACKGROUND OF THE INVENTION

1. Field of the Invention

The present invention relates generally to processors and more specifically to a RISC processor having a debug interface unit.

2. Description of the Related Art

Multi-layer switching procedures and complex data protocols are carried out by processors or by Reduced Instruction Set Computers, (RISC Processors), particularly in switching systems. Typically, the RISC processor is dimensioned for the most efficient energy and space requirements and is optimized according to its applied purpose.

To promptly locate possible errors in the complex processing procedures, it is desirable to externally replicate the data processing procedures sequencing within the RISC processor. Yet, this requires an inquiry into a multitude of interrogation possibilities for registered contents of the RISC processor. Specifically, since the register contents at various locations of the pipeline of the RISC processor must be accessed during an error search, the access possibilities to the data that are intermediately stored in the registers in the pipeline of the RISC processor are difficult to configure. This likelihood of access to the register data stored in the pipeline of the RISC processor is further complicated when the RISC processor together with a program memory is integrated in an ASIC module.

BRIEF SUMMARY OF THE INVENTION

The present invention provides a RISC processor with a debug interface unit. This debug interface unit is integrated within the data transfer unit of the RISC processor. Various type of data, including command data and their pertinent source address are intermediately stored in the various registers of the debug interface unit. These Data are then transmitted from the debug interface unit register content for evaluation by an outside operator.

One aspect of the present invention is that the register contents can be co-read in real time. This is an improvement over the prior systems. Also, the present invention demonstrates the additional advantage in that the area of a RISC processor need only be enlarged by the area of a pin when the input and output interface I of the RISC processor is co-utilized. Moreover, all required information for performing an efficient error search are displayed with the command data, address data and the pertinent destination and source data that may be monitored by an outside operator.

DETAILED DESCRIPTION OF THE PREFERRED EMBODIMENTS

The present invention is explained in greater detail below on the basis of the block diagrams.

Figure 1:
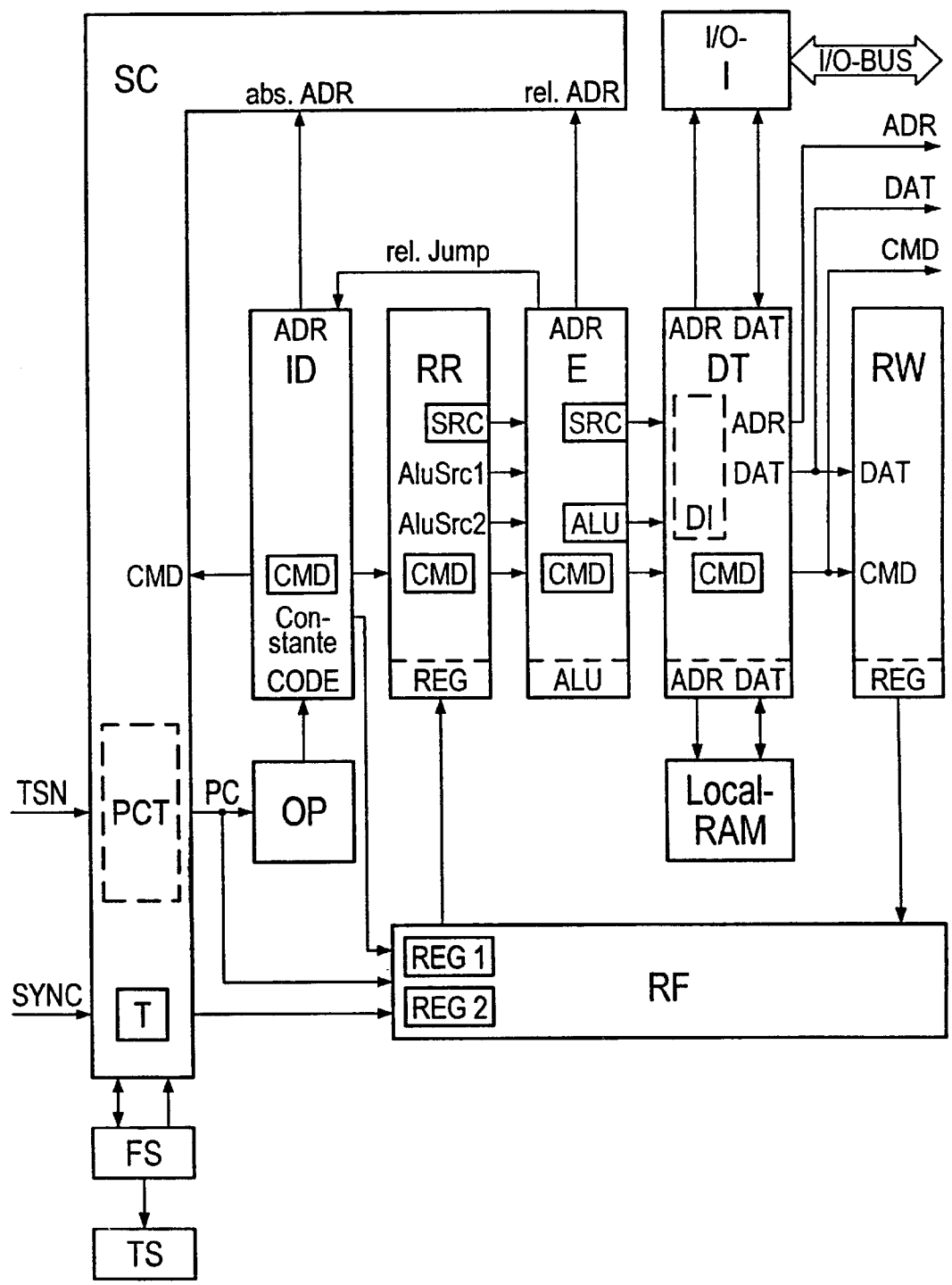
FIG. 1 is a block diagram that shows the structure of a RISC processor according to the present invention.

FIG. 1 schematically shows a structure of a RISC processor and illustrates the critical components arranged in its pipeline. The components include a sequence controller SC, an instruction decoder ID, a register read unit RR, an execute unit E, a debug interface unit DI that may be deployed in a data transfer unit DT, a register write unit RW, an input and output unit I/O as well as a register file RF.

The sequence controller SC essentially identifies an address for the instruction decoder ID for reading out an instruction code from an opcode memory OP. The opcode memory OP, for example, is arranged in an area of a memory module ROM. Commands CMD0, CMD1, CMD2 for the individual units arranged in the pipeline are formed from the command code in the instruction decoder ID. The command data CMDx are then forwarded by the instruction decoder ID to the left and right; namely to the units RR, E, DT, DI, RW or SC arranged in the pipeline. Accordingly, a command field is produced for each of the units RR, E, DT, DI, RW or SC. For example, command fields for the register read unit RR, for the execute unit E, for the data transfer unit DT and for the register write unit RW go toward the right, whereas the command field for direct branch instructions is handed over to the left. The register read unit RR reads commands CMDn from the register file RF and forwards them to the execute unit E. All arithmetic and logical instructions, i.e. all addition and subtraction instructions as well as all logical operations, are executed in the execute unit E.

The RISC processor employs a bus system. An example is a first bus system with an address bus between the program counter PCT and the opcode memory OP and a data bus between the opcode memory OP and the instruction decoder ID, as well as a further bus system with an address bus and a data bus between the data transfer unit DT and the input and output unit I. With the aid of a further bus system, the command bus, each processing unit in the pipeline of the RISC processor is informed of the address and of the data type of the current data (load, store or OP Code).

Upon issuance of an execute and jump command CMD0, the opcode address data transported on the address bus of the first bus system are intermediately stored in a first register REG1 of the register file RF in order to be forwarded in the following processing step via a nonoccupied data connecting line to the debug interface unit DI. The free data connecting path in this case extends via the register read unit RR to the first register SRC of the execute unit E. In addition to the opcode addresses stored in the first register SRC of the execute unit E and the result data formed in the execute unit E, (which are intermediately stored in a second register ALU of the execute unit E), the pertinent execute and jump command CMD0 formed in the instruction decoder ID is also forwarded via the pipeline of the RISC processor to the command register RC in the debug interface unit DI. Controlled by the execute or jump command CMD0, a first and second multiplexer MU1, MU2 and the debug interface unit DI integrated in the data transfer unit DT are driven such that the opcode addresses intermediately stored in the first register SRC of the execute unit E are output by the second multiplexer MU2 and the result data, (intermediately stored in the second register ALU of the execute unit E), are output at the first multiplexer MU1. In the debug interface unit DI, the result data are stored in a data register RD, the opcode addresses are stored in an address register RA, and the command data are intermediately stored in a command register RC. During the next clock period, the data intermediately stored in the registers RD, RC, RA are forwarded via connecting lines to an electrical unit externally arranged at the RISC processor (not explicitly shown here), to be displayed. The command data are transmitted via a command data connecting line and the result data are transmitted via a data connection line, for storing to the read write unit RW.

Upon issuance of a load command CMD1, the source address is forwarded from the second register ALU of the execute unit E to the data transfer unit DT. Also, the load command CMD1 is forwarded to the data transfer unit DT. In the data transfer unit DT, the source data, (that were intermediately stored in the second register ALU of the executed unit E), are output on the address bus to the input and output unit I. Similarly, the source data, adjacent at the debug interface unit DI are also forwarded via the second multiplexer MU2 of the debug interface unit DI to the address register RA of the debug interface unit DI. This transmittal is also controlled by the load command CMD1.

The source data read in via the data bus between the input and output unit I and the data transfer unit DT (that are both controlled by the load command CMD1), are then transmitted to the data register RD of the debug interface unit DI via the first multiplexer MU1 of the debug interface unit DI.

Subsequently and in the next clock period, the load command CMD1 in the command register RC and the source address in the address register RA along with the course and data in the data register are all transmitted for output to the external unit. The command and source data are also handed to the register write unit RW that follows the data transfer unit DT.

The store command CMD2, (initiated by the program counter PCT and the sequence controller SC), is formed in the instruction decoder ID. Store command CMD2 results in the destination data to be read out from a second register REG2 of the register file RF. The destination data that have been read out are loaded into the first register SRC of the register read unit RR. In the next clock period, the destination data proceed from a register SRC of the register read unit RR into a register SRC of the execute unit E. Simultaneously, the store command CMD2 belonging to the destination data is transferred via a separate command bus to the execute unit E.

In the next processing step, the destination address formed in the execute unit E, (which was intermediately stored in a further register LAU of the execute unit E), is handed over to the data transfer unit DT along with the content of the register SRC and the store command CMD2. In the data transfer unit DT, the data in the debug interface unit DI are crossed out via the first and second multiplexer MU1, MU2. In addition, the command CMD2 adjacent at the first multiplexer MU1 results in the destination data, (that were previously read out from the second register REG2 in the register file RF and were intermediately stored in the register SRC of the execute unit E), to be intermediately stored in the data register RD.

Also, the destination address, (that was stored in the register ALU), is likewise transmitted via the store command CMD2 adjacent at the second multiplexer MU2, to the address register RA where it is intermediately stored. In the next clock period, the data intermediately stored in the registers RA, RC and RD are forwarded for output to the external read unit or to the register write unit RW following the data transfer unit DT.

Figure 2:
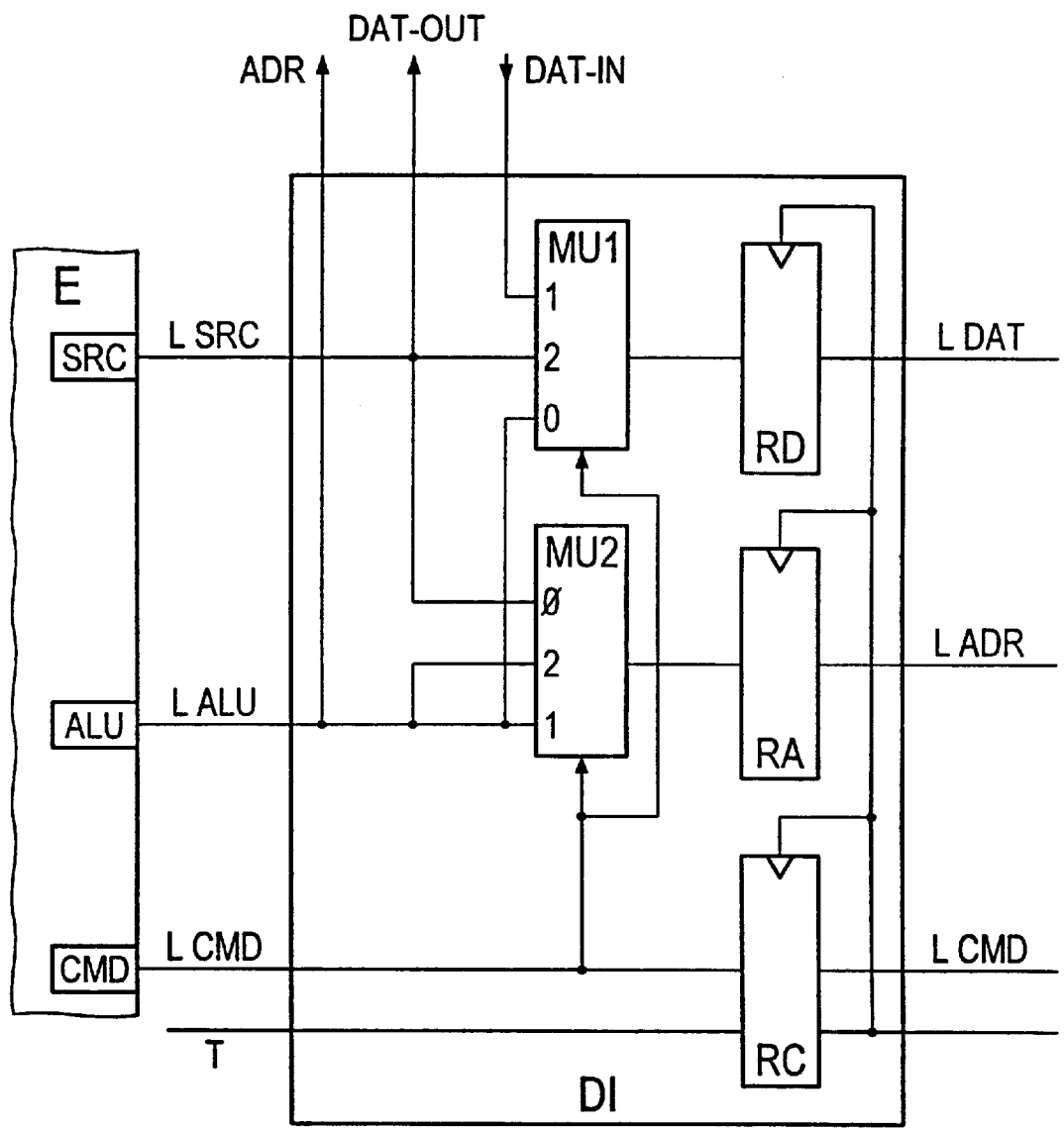
FIG. 2 is a block diagram that shows the structure of a debug interface unit according to the present invention.

FIG. 2 shows the debug interface unit DI integrated in the data transfer unit DT. This debug interface unit DI has its input side connected to the outputs of the registers SRC, ALU and CMD of the execute unit E as well as to a connecting line that forwards the clock. At its output side, the debug interface unit DI is connected to the register write unit RW via the data line referenced LDAT and is also connected to a command line referenced LCMD. The debug interface unit DI is connected via an address line LADR, the data line LDAT, as well as command line LCMD, to a read unit outside the pipe line. This read unit makes it possible for an operator to access the data of processing processes within the RISC processor in the simplest way. The opcode from a listing data file can then be supplemented in this read unit to the opcode addresses given an execute or jump command.

The first and second multiplexer MU1, MU2 is arranged in the debug interface unit DI. The multiplexers are controlled by command data CMD0, CMD1, and CMD2 that are adjacent on the command line LCMD. A first data line LSRC connects the output of the register SRC of the execute unit E to a second input 2 of the first multiplexer MU1, a first input 0 of the second multiplexer MU2 and the data bus DAT of the input/output unit I. A connection to a third input 0 of the first multiplexer MU1, a second input 1 of the second multiplexer and the address bus ADR that leads to the input/output unit I is produced with a second data line LALU from the output of the register ALU of the execute unit E. The output of the first multiplexer MU1 is connected to the data register RD, and the output of the second multiplexer MU2 is connected to the address register RA.

To ensure that the command data CMD0, CMD1 and CMD2 are simultaneously adjacent at the read/write unit RW with the register data RD and address register RA, the command data are intermediately stored in the command register RC. When, for example, an execute or jump command CMD0 is adjacent at the control input of the first and second multiplexer MU1, MU2, then the register data of the second register ALU of the execute unit E are forwarded via the first multiplexer MU1 to the data register RD.

Upon issuance of a load command CMD1, the data to be read in via the input/output unit I are forwarded via the first multiplexer MU1 to the data register RD, and the data intermediately stored in the second register ALU of the execute unit E are forwarded via the second multiplexer MU2 to the address register RA.

Upon issuance of a store command CMD2, the data of the first register SRC in the execute unit E are forwarded via the first multiplexer MU1 and the data from the second register (ALU of the execute unit E) are forwarded via the second multiplexer MU2 to the following register.

What is claimed is:

1. A method for co-reading data on a bus system between a sequence controller and an instruction decoder in a RISC processor, comprising the steps of:

intermediately storing, per clock unit, a first data output of the sequence controller in a first register of a register file of the RISC processor;

intermediately storing a second data output of the instruction decoder unit in a second register of the register file of the RISC processor:

issuing at least one of a first command and a second command by said instruction decoder;

reading out said first data output from said first register upon issuance of said first command by the instruction decoder;

reading out, via a register unit of the RISC processor, said second data output and intermediately storing said second data output in a register of an execute unit of the RISC processor upon issuance of said second command by the instruction decoder;

intermediately storing data in the register of the execute unit of the RISC processor;

storing commands issued by the instruction decoder in command registers of a debug interface unit of the RISC processor;

simultaneously forwarding said commands and the data stored in said execute unit to a data transfer unit of the processor; and allocating to designated data outputs, per clock unit, data transmitted to the data transfer unit.

2. A circuit arrangement between a sequence controller and an instruction decoder in a RISC processor, comprising:

a first register for intermediately storing of data output by the sequence controller;

a second register for intermediately storing of data output by the instruction decoder;

a read write register unit deployed between the instruction decoder and an execute unit of the RISC processor;

a register in said execute unit of the RISC processor for intermediate storage of a data readout by the first register and the second register via the read write register; and a data interface unit deployed within a data transfer unit of the RISC processor that simultaneously allocates pending data at the transfer unit to defined data outputs of the data transfer unit.

3. A circuit arrangement according to claim 2, further comprising:

a first and a second multiplexer unit deployed within the interface unit of the RISC processor that forwards data adjacent at a first and second input of the data transfer unit from registers of the execute unit, upon commands issued from a command of the processor.

4. A circuit arrangement according to claim 2, wherein:

first said first register and said second register are deployed within a register file of the RISC processor.

* * * * *